June 14, 1966    K. J. TUTT    3,255,493
MOLD FOR INJECTION MOLDING A SHOE SOLE
Filed Aug. 6, 1963    4 Sheets-Sheet 1

Inventor
Kingsley J. Tutt
By his Attorney

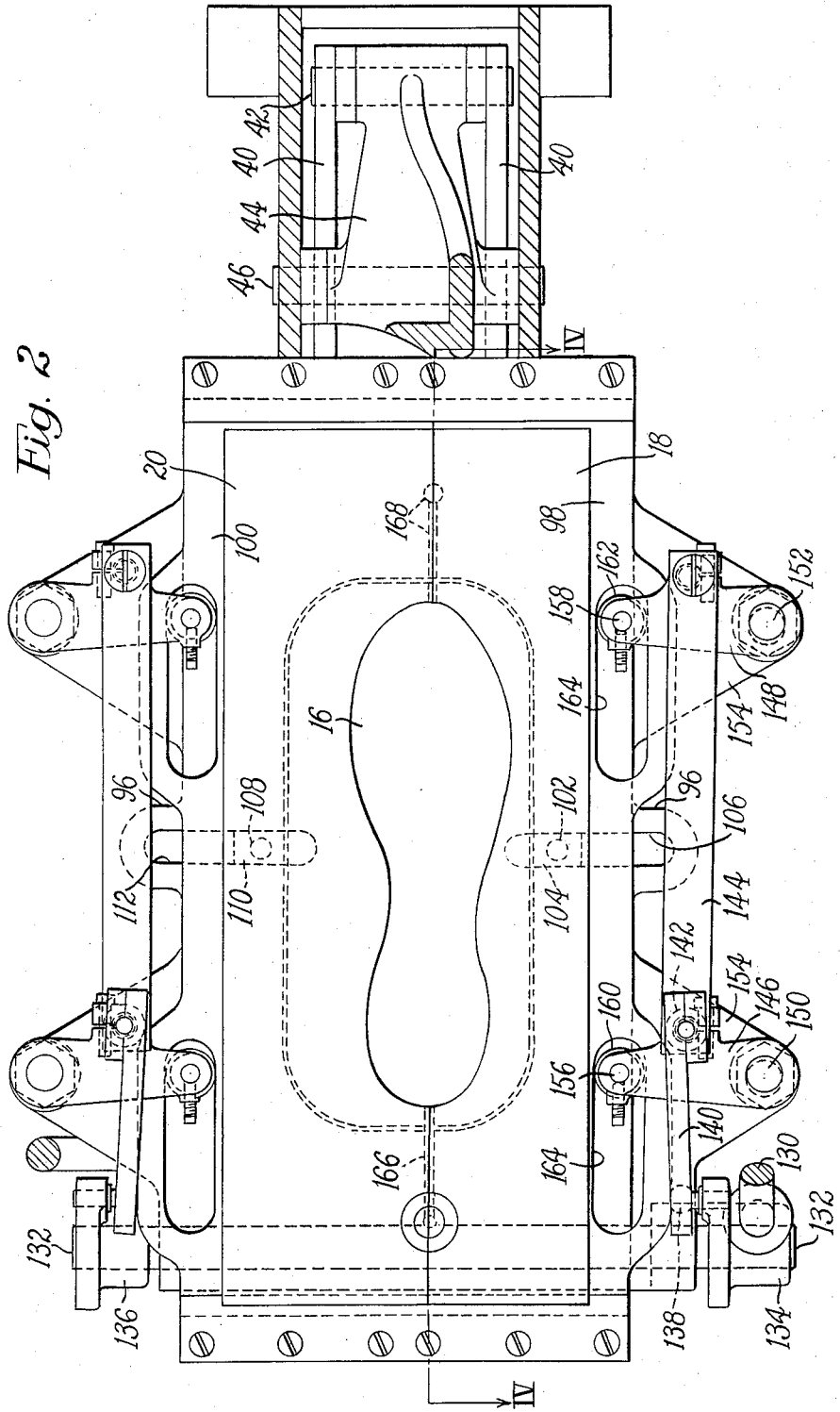

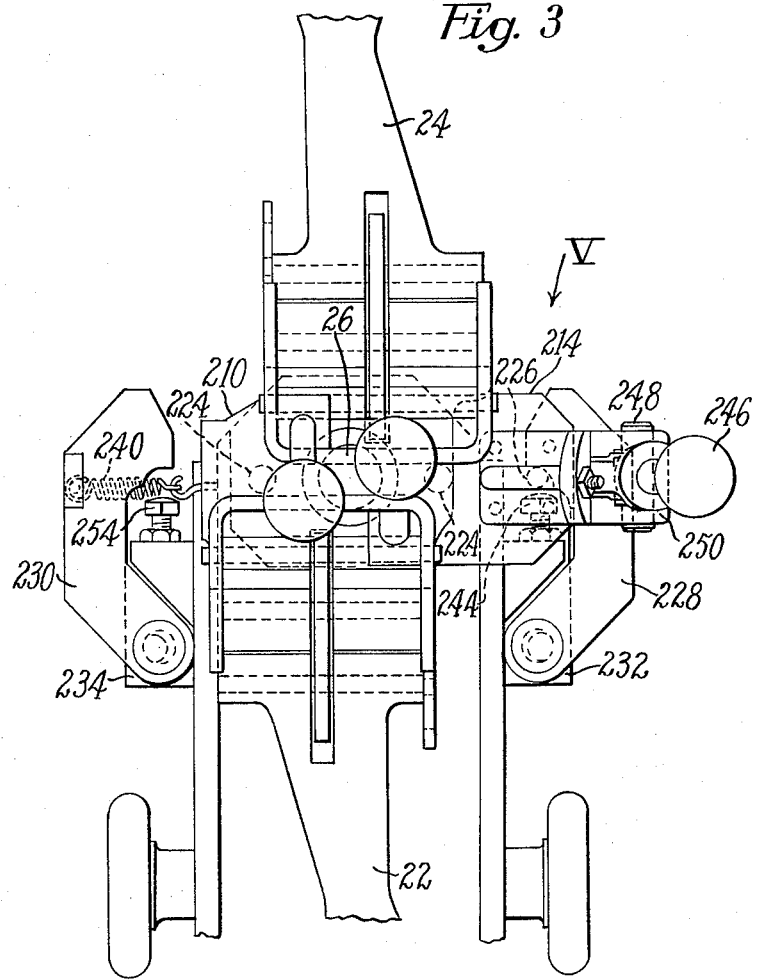

June 14, 1966           K. J. TUTT           3,255,493
MOLD FOR INJECTION MOLDING A SHOE SOLE
Filed Aug. 6, 1963           4 Sheets-Sheet 4
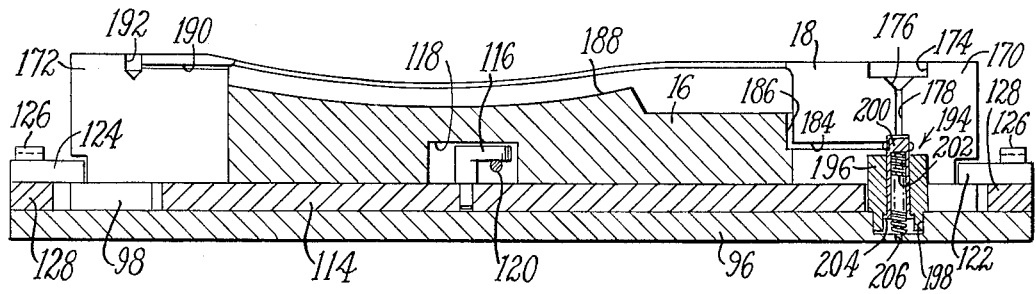
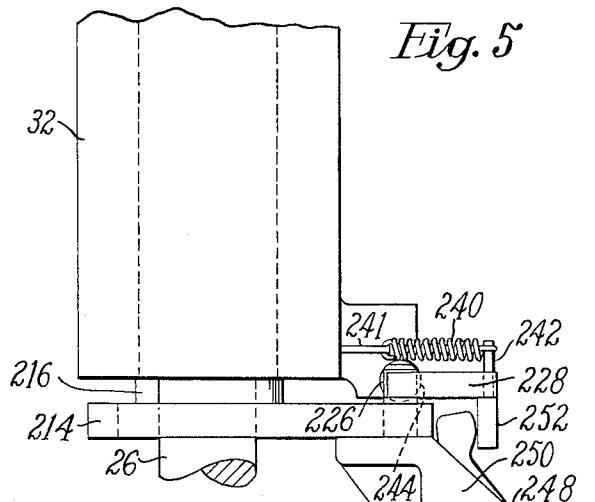
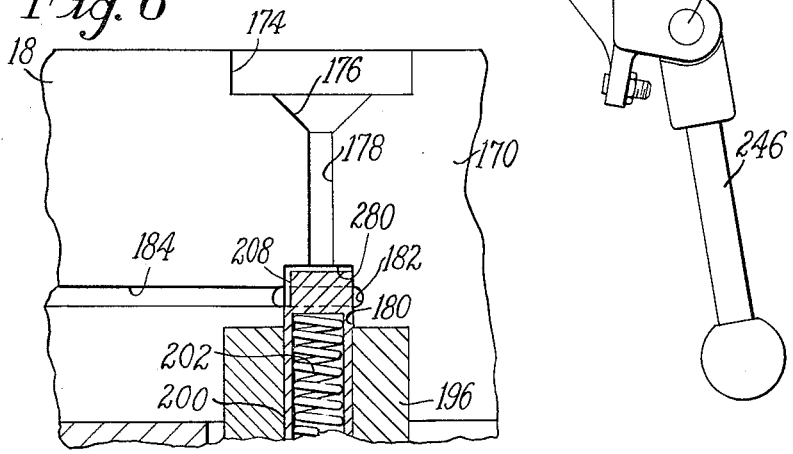

United States Patent Office 3,255,493
Patented June 14, 1966

3,255,493
MOLD FOR INJECTION MOLDING A SHOE SOLE
Kingsley J. Tuit, Leicester, England, assignor to United Shoe Machinery Corporation, Flemington, N.J., a corporation of New Jersey
Filed Aug. 6, 1963, Ser. No. 300,218
Claims priority, application Great Britain, Aug. 24, 1962, 32,544
3 Claims. (Cl. 18—42)

This invention relates to injection molding machines, and is herein illustrated in its application to machines for molding shoe soles in situ onto the bottoms of lasted shoes. Machines of this type are disclosed, for example, in United States Letters Patent No. 2,937,405, granted May 24, 1960 in the names of Loring J. Berggren et al. and in United States Letters Patent No. 3,014,242, granted December 26, 1961 in the names of Willard L. Baker et al. While the invention is herein illustrated in its application to machines for molding soles onto shoe bottoms it is to be understood that the invention is not limited in its scope to machines of this type but is applicable to other types of molding machines.

It is an object of the present invention to provide an improved injection molding machine adapted to the molding of plastisol soles in situ onto the bottoms of lasted shoes. It is a further object of the invention to provide a machine of this type which is of simple construction, inexpensive to manufacture and easy to operate.

With the above and other objects in view as will hereinafter appear, the present invention in one aspect thereof consists in the provision in an injection molding machine of mold members which are constructed to facilitate the mold charging operation by the provision in their parting faces of matching recesses which cooperate when the parting faces are mutually contacting to form a receptacle for an injection nozzle. In order to provide for the flow of plastic material from the receptacle to the mold cavity the parting faces of the mold members have formed therein matching recesses which cooperate to form a passage from the receptacle to the mold cavity. In order to prevent backflow of fluid material in the mold cavity there is provided means, herein illustrated as a valve member, for obstructing the flow of fluid from the mold cavity through said passage, said valve member being operable in a chamber provided by the formation of the matching recesses in said parting faces. In order that the sprue extending from the mold cavity to the nozzle receptacle shall form a unitary structure attached to the newly molded sole there is formed in the valve member a recess which provides a course in the passage from the receptacle to the mold cavity. Said recess is large enough to receive and retain fluid plastic during the advancement of the valve member but small enough to prevent any appreciable backflow from the mold cavity during the setting of a charge therein. The illustrated valve member is spring biased to a position in which it obstructs backflow from the mold cavity but is so arranged that it yields to pressure from a mold charging means to permit the flow of fluid plastic to charge the mold cavity.

These and other features of the invention will now be described with reference to the accompanying drawings and pointed out in the appended claims.

In the drawings:

FIG. 2 is a plan view of the mold organization partly in section on the line II—II of FIG. 1;

FIG. 3 is a front elevation illustrating parts of the work supporting organization;

FIG. 4 is a section on the line IV—IV of FIG. 2;

FIG. 5 is a plan view of certain operating mechanisms as indicated by the arrow V in FIG. 3; and FIG. 6 is an enlarged view in side elevation of the heel end portion of a side mold member and related parts partly in section on the line IV—IV of FIG. 2.

Figure 1:
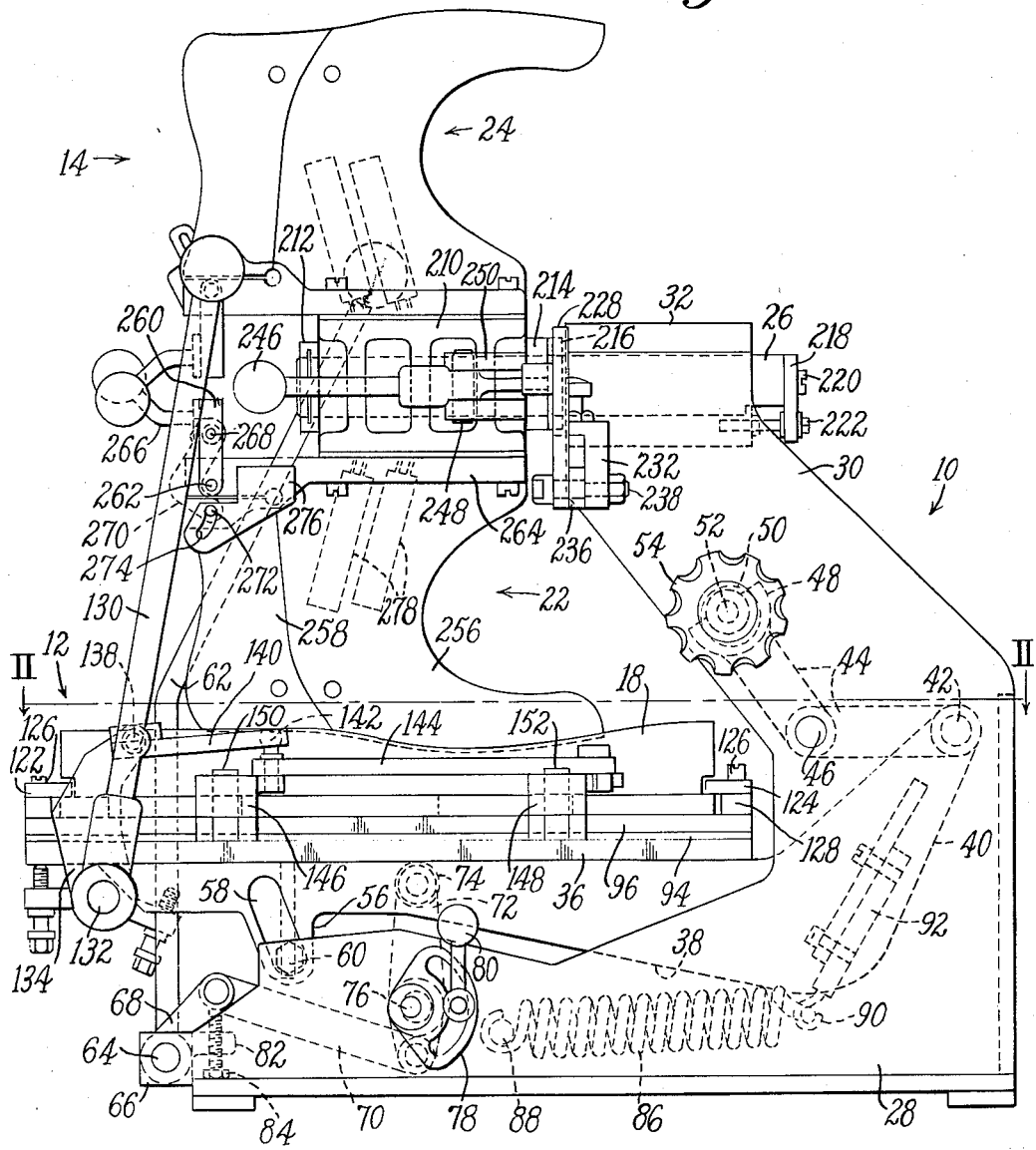
FIG. 1 is a right side elevation of a machine embodying the present invention.

The invention is illustrated in the drawings as embodied in a machine for molding bottom units, herein illustrated as sole and heel units, in situ, onto the bottoms of lasted shoes. The illustrated machine is intended primarily for use in the molding of sole and heel units of plastisol resinous material.

The illustrated machine comprises a frame 10 in which are mounted a mold assembly generally indicated by the numeral 12 and a work supporting assembly generally indicated by the numeral 14. Referring to FIG. 2 the mold assembly comprises a bottom mold member 16 which defines the peripheral contour and the profile of a shoe sole to be molded onto the bottom of a lasted shoe and two side mold members 18 and 20 movable toward and from each other. In their closed position illustrated in FIG. 2 the side mold members are in contiguous relation to the edge face of the bottom mold member and cooperate with the bottom mold member to provide a mold cavity which is covered and sealed by a lasted shoe during the mold charging operation.

Referring to FIG. 1 the illustrated work supporting assembly comprises two shoe forms 22 and 24 oppositely mounted on a base structure hereinafter described mounted for rotation on a horizontal shaft 26 extending from front to back of the machine. In the operation of the machine each shoe form in turn is brought into registration with the illustrated mold assembly, the shoe form 22 being shown in FIG. 1 in registration with the mold assembly.

The illustrated frame 10 comprises a base portion 28 and a column 30 extending upwardly with a forward inclination from the base portion, said column having formed at its upper extremity a cylindrical head 32 which is bored to provide a bearing for the shaft 26.

The illustrated mold mounting assembly comprises a platform member herein illustrated as a plate 36 (FIG. 1) having downwardly extending ribs 38 having rearward extensions 40 which are pivotally mounted on a shaft 42. The shaft 42 is carried in the rear portion of a bent lever 44 which is pivotally mounted on a cross shaft 46 mounted in the column 30. The upper end portion of the lever 44 has formed therein a semi-circular yoke 48 which receives a roll 50 eccentrically mounted on a shaft 52 journaled in the column 30. One end portion of the shaft 52 has fixed thereto a hand wheel (not shown) whereby the shaft 52 is rotatably adjusted. The opposite end portion of the shaft has fixed thereto a locking wheel 54 whereby the shaft 52 is secured in its adjusted position. When the hand wheel is turned to rotate the shaft 52 the shaft 42 is adjusted vertically within the limits of eccentricity of the roll 50. In the illustrated organization such adjustment of the shaft 42 rocks the mold assembly upon a transverse axis located vertically at the top surfaces of the side mold members 18 and 20 and horizontal approximately midway between the ends of the mold members. The platform member 36 has two downwardly extending lugs 56, only one of which is seen in FIG. 1, each having an outwardly facing machined surface 58. Set screws 60 in opposite side portions of the base 28 engage the machined surfaces 58 and serve to position the mold assembly widthwise relatively to the machine frame 10. The mold assembly is movable upwardly into its molding station by angular movement upon the shaft 42. To this end the illustrated machine is provided with a hand lever 62 which is secured to a cross shaft 64 mounted in spaced lugs 66 extending forwardly from the base 28. An arm 68 fixed to the shaft 64 extends upwardly and rearwardly therefrom and is pivotally connected to a link 70 which in turn is pivoted at its rear end portion to the lower portion of a vertical lever 72. The lever 72 carries at its upper extremity a roll 74 which engages the bottom surface of the plate 36. The lever 72 is pivotally mounted on an eccentric shaft 76 mounted in the base 28. An end portion of the shaft 76 projected outwardly from the base 28 has secured thereto a segment 78 which is secured in adjusted position by a locking lever 80. Rotation of the shaft 76 adjusts the mold assembly vertically. A short arm 82 secured to the cross shaft 64 and extending rearwardly therefrom carries a stop screw 84 which may be adjusted to determine the rearmost position of the hand lever 62 and thus the uppermost position of the roll 74 by engagement with a flange formed in the base 28. In order to counter-balance to some extent the weight of the mold assembly there is provided a spring 86 the forward portion of which is anchored to a cross pin 88 in the base 28 and the rear portion to a hook 90 fixed in the lower extremity of a cross head 92 carried by the extensions 40.

For heating the mold assembly thereby to cause a resinous solution in the mold cavity to set, the illustrated mold assembly includes a thin plate 94 mounted on the plate 36 and connected to a source of electrical energy. Secured to the plate 36 above and in contact with the heater plate 94 is a plate 96.

Referring now to FIG. 2 the side mold member 18 is mounted on a carrier plate 98 and the side mold member 20 is mounted on a similar carrier plate 100, said carrier plates being slidably mounted on the plate 96. In order to guide the movements of the carrier plates, mechanism now to be described is provided. A pin 102 fixed in the carrier plate 98 has swiveled thereon a block 104 arranged to slide in a transverse slot 106 formed in the plate 96. Similarly a pin 108 fixed in the carrier plate 100 has swiveled thereon a block 110 arranged to slide in a transverse slot 112 formed in the plate 96. Referring to FIG. 4 the bottom mold member 16 is mounted on a carrier plate 114 which is secured to the plate 96. For holding the bottom mold member against movement away from the plate 96 a button 116 having an offset head is secured to the carrier plate 114 and is received within a recess 118 provided therefor in the bottom mold member. The button engages a cross pin 120 mounted in the bottom mold member. While holding the bottom mold member against upward movement from the carrier plate 114 the button permits such sliding movement of the bottom mold member upon the carrier plate 114 as may be necessary to adjust it to the closed position of the side mold members. The carrier plates 98 and 100 are held against upward movement from the plate 96 by holddown plates 122 and 124 secured to the plate 96 by headed screws 126 and spaced from the plate 96 by blocks 128. The side mold members 18 and 20 are registered upon the carrier plates 98 and 100 by suitable dowels and are secured thereto by screws (not shown).

For moving the side mold members to and from their mutually closed position relatively to the bottom mold member manually operated mechanism now to be described is provided. A hand lever 130 (FIGS. 1 and 2) is secured to one end of a cross shaft 132 extending the full width of the mold assembly and journaled in bearings in the platform member 36. Secured to opposite end portions of the shaft 132 are upwardly extending bent arms 134 and 136. The arm 134 is connected by a ball and socket joint 138 to a link 140 which is connected at its rear end by a ball and socket joint 142 to a horizontal bar 144 which constitutes one element of a parallel motion mechanism. Said mechanism comprises two arms 146 and 148 pivoted respectively on pins 150 and 152 secured in outwardly extending ears 154 of the plate 36. The bar 144 is pivotally connected to the parallel arms 146 and 148 as shown in FIG. 2 and these arms are provided respectively with downwardly extending pins 156 and 158 which carry respectively rolls 160 and 162 which operate in slots 164 formed in the carrier plate 98. In the operation of the machine the hand lever 130 is swung counterclockwise as shown in FIG. 1 to cause the rolls 160 and 162 to move longitudinally of the slots 164 thereby to move the carrier plate 98 together with the side mold member 18 outwardly away from the companion side mold member 20. In the position shown in FIG. 2 the side mold member 18 is in its closed position and the arms 146 and 148 are just beyond their dead center positions thus locking the carrier plate 98 against outward or retracting movement.

The hand lever 130 operates a parallel motion mechanism at the left side of the machine similar to that above described for operating the carrier plate 100 so that the side mold members 18 and 20 receive simultaneously equal and opposite movements toward and from each other to effect the closing and opening of the mold assembly.

In its closed position the mold assembly provides an inlet passage or duct 166 and an outlet passage or duct 168. In the illustrated organization the inlet duct communicates with the heel end portion of the mold cavity and the outlet duct with the toe end portion. The ducts are provided by forming matching grooves or channels in the parting faces of the side mold members. Referring to FIG. 4 which illustrates in side elevation the side mold member 18, the parting face at the heel end of the side mold member is identified by the numeral 170 and the parting face at the toe end by the numeral 172. Formed in the parting face 170 is a semi-cylindrical recess 174 which communicates through a converging recess 176 with a vertical groove 178 which extends downwardly to a semi-cylindrical recess 180 (FIG. 6). Formed in the wall of the recess 180 is a groove 182 arranged in a horizontal plane and extending conterminously with the wall of the recess. The groove 182 communicates with a horizontal groove 184 which in turn communicates with a vertical groove 186 (FIG. 4) formed in the extremity of the heel portion of the bottom mold member 16. The groove 186 extends upwardly from the groove 184 to the extremity of the heel portion of the mold cavity which in FIG. 4 is identified by the numeral 188. The side mold member 20, not shown in FIG. 4, has parting faces and a groove structure corresponding to the structure above described. When the side mold members are in their mutually closed position, the grooves meet to provide the inlet duct indicated in FIG. 2 by the numeral 166. Referring again to FIG. 4 the outlet duct 168 is provided by forming in the parting face 172 a horizontal groove 190 extending from the extremity of the toe portion of the mold cavity 188 to a vertical semi-cylindrical recess 192 of substantially greater diameter than the groove 190 and having an open end at the upper surface of the toe portion of the side mold member. The groove 190 and the recess 192 together provide one-half of the outlet duct 168, the other half being formed in the side mold member 20. Thus it will be seen that the inlet 166 comprises a relatively large cylindrical entry port communicating through a frusto conical passage with a vertical duct leading to a cylindrical chamber which communicates through the annular groove 186 and the horizontal duct 184 with the vertical groove 186 the upper end of which opens into the mold cavity.

For controlling the flow of fluid through the inlet system there is provided a valve organization identified generally by the numeral 194. The illustrated valve comprises a cylindrical housing 196 (FIG. 4) the reduced lower end portion of which is seated in a socket 198 formed in the plate 96. When the side mold members are in their mutually closed position the housing 196 is embraced by the walls of semi-cylindrical recesses formed in the side mold members to accommodate the housing.

Slidably mounted in an axial vertical bore in the housing 196 is a valve plunger 200 which is axially bored to receive a spring 202 the upper end of which bears against the base of the bore and the lower end against the base of the socket 198. The base of the housing 196 is counterbored to receive an outturned flange 204 and the spring 202 normally holds the plunger in its position illustrated in FIGS. 4 and 6 with the flange 204 seated against the base of the counterbore. A small bore 206 extending from the base of the socket to the bottom of the plate 96 provides a vent for the valve plunger 200. When the valve plunger is in its normal rest position illustrated in FIGS. 4 and 6 the upper end face of the plunger is spaced from the ceiling of the chamber 180. A vertical groove 208 formed in the upper portion of the plunger connects the space above the plunger to the annular groove 182.

Referring to FIGS. 1 and 3 the illustrated work supporting assembly comprises the two shoe forms 22 and 24 which are removably attached to opposite faces of a supporting block 210 which is mounted for rotation on the shaft 26. The block 210 is positioned endwise of the shaft 26 between a locking ring 212 and a plate 214 freely mounted on the shaft and arranged in contiguous relation to a collar 216 which in turn bears against a shoulder formed in the shaft. In order to determine accurately the position of a shoe form endwise thereof relatively to the mold assembly the shaft 26 is slidably mounted in its bearing in the head 32 for adjustive movement endwise thereof and in order to effect such adjustment of the shaft a depending plate 218 is secured by headed screw 220 to the outwardly extending end portion of the shaft and an adjusting screw 222 is mounted for rotation in the lower portion of the plate 218 and has threaded engagement in a tapped bore in the head 32. In order to provide for the locking of the block 210 with one of the two shoe forms in registration with the mold assembly the following mechanism is provided. The plate 214 is connected to the block for rotation therewith by two pins 224 mounted in the plate and seated in suitable sockets in the block. The plate carries at its outer extremity a pin 226 and cooperating with the pin to secure the work supporting assembly alternatively in either of its two operation positions are two latches 228 and 230 mounted respectively on blocks 232 and 234. Referring to FIG. 1 each block is secured to a lug 236 projecting outwardly from the upper portion of the column 30 by a bolt 238. Referring to FIG. 5 the latch 228 is actuated by a spring 240 anchored at one end to a hook 241 on the head 32 and at its opposite end to a pin 242 projecting rearwardly from the latch. When the work supporting assembly is in its position illustrated in FIG. 3 the pin 226 is held between the latch member 228 and an adjustable locating screw 244. For disengaging the latch member 228 from the pin 226 to permit rotation of the work supporting assembly in a counterclockwise direction as seen in FIG. 3 a release lever 246 (FIG. 5) is fulcrumed on a pin 248 mounted in a bifurcated extension of a bracket 250 fixed to the plate 214. At its rear end the lever 246 has an offset head which acts upon a lug 252 projecting forwardly from the latch member 228. Movement of the releasing lever 246 in a clockwise direction as seen in FIG. 5 disengages the latch member 228 from the pin 226 thus permitting the rotation of the work supporting assembly in a counterclockwise direction as seen in FIG. 3 thereby to bring the shoe form 24 into its position of registration with the mold assembly. Such movement of the work supporting assembly is arrested by the engagement of the pin 226 with the abutment screw 254, the assembly being held against return movement by the latch member 230 which corresponds in its construction and arrangement to the latch member 228. The latch member 230 is releasable from the pin 226 by the operation of the releasing lever 246 in the same manner as the latch member 228.

The two shoe forms 22 and 24 are similar in construction and it will be understood that the following description of the shoe form 22 is equally applicable to the shoe form 24. Referring to FIG. 1 the shoe form 22 comprises a forward portion 256 and a heel portion 258. The heel portion is movable upwardly relatively to the forward portion 256 from its extended position illustrated in FIG. 1 into a position in which the shoe form is foreshortened to facilitate the removal therefrom of a shoe having a sole newly molded thereon and the mounting thereon of a lasted shoe onto which a sole is to be molded. For effecting such upward movement of the heel portion 258 the illustrated shoe form has an upwardly extending yoke 260 pivoted at 262 on the left end portion of a base plate 264 secured to the forward portion 256. Fixed to the yoke 260 is a hand lever 266. Pivotally mounted on a cross pin 268 carried by the yoke 260 is an angular link 270 which is pivotally connected to the heel portion 258 by a pin 272 having an end portion projecting into a slot 274 provided in a plate 276 secured to the base plate 264. When the hand lever 266 is swung downwardly as seen in FIG. 1 the heel portion 258 moves downwardly and forwardly relatively to the forward portion 256, such movement of the heel portion being guided by the pin 272 traveling in the slot 274 and by connecting means (not shown) between the heel portion and the forward portion of the shoe form.

In order to assist in the heating of a charge in the mold cavity the illustrated shoe form is heated by suitable heating cartridges 278 inserted into sockets provided in the forward portion 256 of the shoe form.

In the operation of the illustrated machine the shoe form assembly and the mold assembly are adjusted relatively to each other so as to provide a completely sealed mold cavity. To this end the shoe form can be adjusted longitudinally by turning the adjusting screw 222 (FIG. 1) to effect endwise movement of the shaft 26. The shoe form is also adjustable circumferentially of the shaft 26 by adjustment of the screws 244 and 254. The mold assembly is adjustable angularly about a transverse axis by rotation of the eccentric shaft 52 and vertically by adjustment of the segment 78.

Preparatory to the sole molding operation the mold assembly and the two shoe forms are heated to a predetermined temperature. After necessary adjustments have been made and the shoe forms and the mold assembly have been heated a lasted shoe onto which a sole is to be molded is mounted on the uppermost of the two shoe forms which has been broken to receive it. The shoe form is then extended by the operation of the hand lever 266 (FIG. 1) whereupon the hand lever 246 is operated to release the shoe form assembly for rotation upon the shaft 26 thereby to bring the uppermost of the two shoe forms into registration with the mold assembly. The hand lever 130 is then operated to advance the side mold members into their mutually closed position whereupon the hand lever 62 is operated to swing the mold assembly upwardly into shoe engaging position in which the side mold members forcibly engage the upper along the feather line and effectively seal the mold cavity. A suitable plastisol dispensing device is then brought into registration with the recess 174 which forms the mouth of the inlet system whereupon plastisol is forcibly expressed from the dispensing device downwardly through the vertical duct 178 thus depressing the valve plunger 200 against the pressure of the spring 202. Downward movement of the valve plunger opens the horizontal duct 184 and permits the flow of plastisol into the mold cavity 188. When the cavity has been filled plastisol flows through the outlet duct 190 and appears at the tell tale recess 192. When the operator sees plastisol rising in the tell tale recess, he terminates the charging of the mold cavity and leaves the charge therein for a period of time suitable for the setting of the sole and heel unit. Upon the termination of the mold charging operation the spring 202 returns the valve plunger 200 to its uppermost position illustrated in FIG. 4 thus restraining the flow of plastisol from the mold cavity. After the expiration of the time required for the setting of the sole and heel unit the operator opens the side mold members by operating the hand lever 130 thus exposing the sole and heel unit newly molded and attached to the lasted upper on the shoe form. The sole and heel unit has attached to it at its toe end sprue consisting of plastic material which solidified in the outlet ducts and at its heel end sprue consisting of plastic material which solidified in the groove 186 and the horizontal duct 184 together with plastic material which solidified in the vertical duct 178 and the recess 174, the plastic in the duct 178 being connected to the plastic in the duct 184 by plastic which solidified in the groove 208 in the head of the plunger 200 and in the space 280 (FIG. 6) above the head of the plunger. Thus there is provided a single unitary sprue system extending from the heel end of the sole and heel unit to the mouth of the inlet system. When the side mold members are opened this entire sprue system is connected to the heel end of the sole and heel unit thus obviating the necessity of extracting solidified plastic from any portion of the inlet system.

Another lasted shoe upon which a sole and heel unit is to be molded is then mounted upon the uppermost of the two shoe forms and the hand lever 246 is again operated to release the shoe form assembly for rotation upon the shaft 26 whereupon the assembly is inverted to bring the shoe having a sole newly molded thereon into the uppermost position and to bring the lasted shoe onto which a sole and heel unit is to be molded into registration with the mold assembly. The then uppermost shoe form is now broken and the shoe with the sole newly molded thereon is removed from the shoe form and the two sprue systems are trimmed from the sole and heel unit in any suitable manner.

When it is desired to remove one set of shoe forms from the machine and mount another set in its place, it is necessary only to remove the ring 212 from the shaft 26 thus to permit the removal from the shaft of the assembly comprising the two shoe forms and the block 210 to which they are connected and its replacement by a similar assembly having shoe forms of the desired size and style. When it is desired to remove the side mold members it is necessary only to detach the holddown plates 122 and 124 from the plate 96. After the side mold members have been removed the bottom mold member is detachable from the carrier plate 114 by merely moving it heelwardly to disengage the cross pin 120 from the button 116.

Having thus described my invention, what I claim as new and desire to secure by Letters Patent of the United States is:

1. In an injection molding machine, a mold assembly including mold members having inner surfaces defining peripheral contours of a shoe sole, said mold members having at one end portion of the mold assembly plane parting faces, the parting faces being characterized by the formation therein of matching recesses which cooperate when the parting faces are mutually contacting to form a receptacle for an injection nozzle, said parting faces being further characterized by the formation therein of matching recesses which cooperate when the parting faces are mutually contacting to form a chamber for receiving a valve body, said parting faces being still further characterized by the formation therein of matching recesses which cooperate when the parting faces are mutually contacting to form a first passage connecting the receptacle to the chamber and a second passage connecting the chamber to the inner surfaces of said mold members, a valve body mounted in said chamber and so constructed that in its valve-closing position it affords a space between the valve body and the chamber which is restricted in size to prevent the flow of fluid plastic therethrough but adequate, nevertheless, for the formation therein of a plastic link connecting the plastic in the first passage to the plastic in the second passage whereby there is formed a unitary sprue structure extending from the mold cavity to the receptacle and comprising all of the plastic residue between said parting faces.

2. In an injection molding machine, a mold assembly forming a mold cavity, said assembly including mold members having inner surfaces defining peripheral contours of a shoe sole, said mold members having plane parting faces which are characterized by the formation therein of matching recesses which cooperate when the parting faces are mutually contacting to form a receptacle for an injection nozzle, said parting faces being further characterized by the formation therein of matching recesses which cooperate when the parting faces are mutually contacting to form a first passage communicating with the receptacle, said parting faces being still further characterized by the formation therein of matching recesses which cooperate when the parting faces are mutually contacting to form a cylindrical chamber communicating with and in axial alinement with said first passage, said parting faces being still further characterized by the formation therein of matching recesses which cooperate when the parting faces are mutually contacting to form a second passage connecting said chamber to the mold cavity and arranged in diametrical relation to said chamber, a valve body mounted in said chamber and spring biased in a direction to close said passages.

3. In an injection molding machine according to claim 2, means for determining a closed position of the valve body such that the valve body is not seated against the extremity of the chamber but on the contrary a small space is left between the extremity of the valve body and the extremity of the chamber, said valve body being characterized by the provision therein of a third passage which in the closed position of the valve body provides communication between said small space and the second passage, the dimensions of said space and said third passage being such that the valve body in its closed position substantially prevents back flow of fluid plastic from the mold cavity through the second passage while permitting the occurrence in said space and said third passage of plastic sufficient to form an effective link between plastic residue in the first passage and plastic residue in the second passage.

References Cited by the Examiner

UNITED STATES PATENTS

| | | | |
|---|---|---|---|
| 2,461,723 | 2/1949 | Cowan | 18—30 |
| 2,499,565 | 3/1950 | Booth | 18—42 |
| 2,878,523 | 3/1959 | Hardy | 264—54 X |
| 2,892,214 | 6/1959 | McCarthy | 18—30 |
| 2,945,260 | 7/1960 | Bell | 18—42 |
| 3,014,242 | 12/1961 | Baker et al. | 18—30 |
| 3,018,517 | 1/1962 | Ludwig | 18—17 |
| 3,055,056 | 9/1962 | Barton | 18—30 |
| 3,109,200 | 11/1963 | Ludwig | 18—30 |

J. SPENCER OVERHOLSER, *Primary Examiner.*

M. V. BRINDISI, *Examiner.*

WILBUR L. McBAY, *Assistant Examiner.*